United States Patent [19]

Gutsfeld

[11] 4,224,793
[45] Sep. 30, 1980

[54] STREAM-POWERED TURBINE VANES

[76] Inventor: Anton F. Gutsfeld, 13 London St. North, Hamilton, Ontario,, Canada, L8H 4B2

[21] Appl. No.: 55,892

[22] Filed: Jul. 9, 1979

Related U.S. Application Data

[63] Continuation-in-part of Ser. No. 680,684, Apr. 27, 1976, Pat. No. 4,104,536.

[51] Int. Cl.³ .............................................. F03B 13/12
[52] U.S. Cl. ......................................... 60/398; 415/6
[58] Field of Search ................ 415/6; 60/398; 290/43, 290/54

[56] References Cited

U.S. PATENT DOCUMENTS 3,965,679 6/1976 Paradiso ................................. 60/398
4,095,422 6/1978 Kurake .................................. 60/398

Primary Examiner—Allen M. Ostrager

[57] ABSTRACT

A stream-powered turbine has an improved vane construction which insures that the flow pressure of the stream will be applied to the entire trailing surface of the vane. Each vane has a valve opening therethrough, and a flap valve pivotally mounted on the vane and selectively operable to close the valve opening. The improvement includes a dam-like shield at the outer end portion of the vane. This shield is provided with one or more control openings aligned with the flap valve. As the vane approaches the standing wave ahead of the turbine, water passes through the control openings to close the aligned flap valves, thereby insuring that the pressure of the flow will be applied to the entire trailing surface of the vane.

5 Claims, 4 Drawing Figures

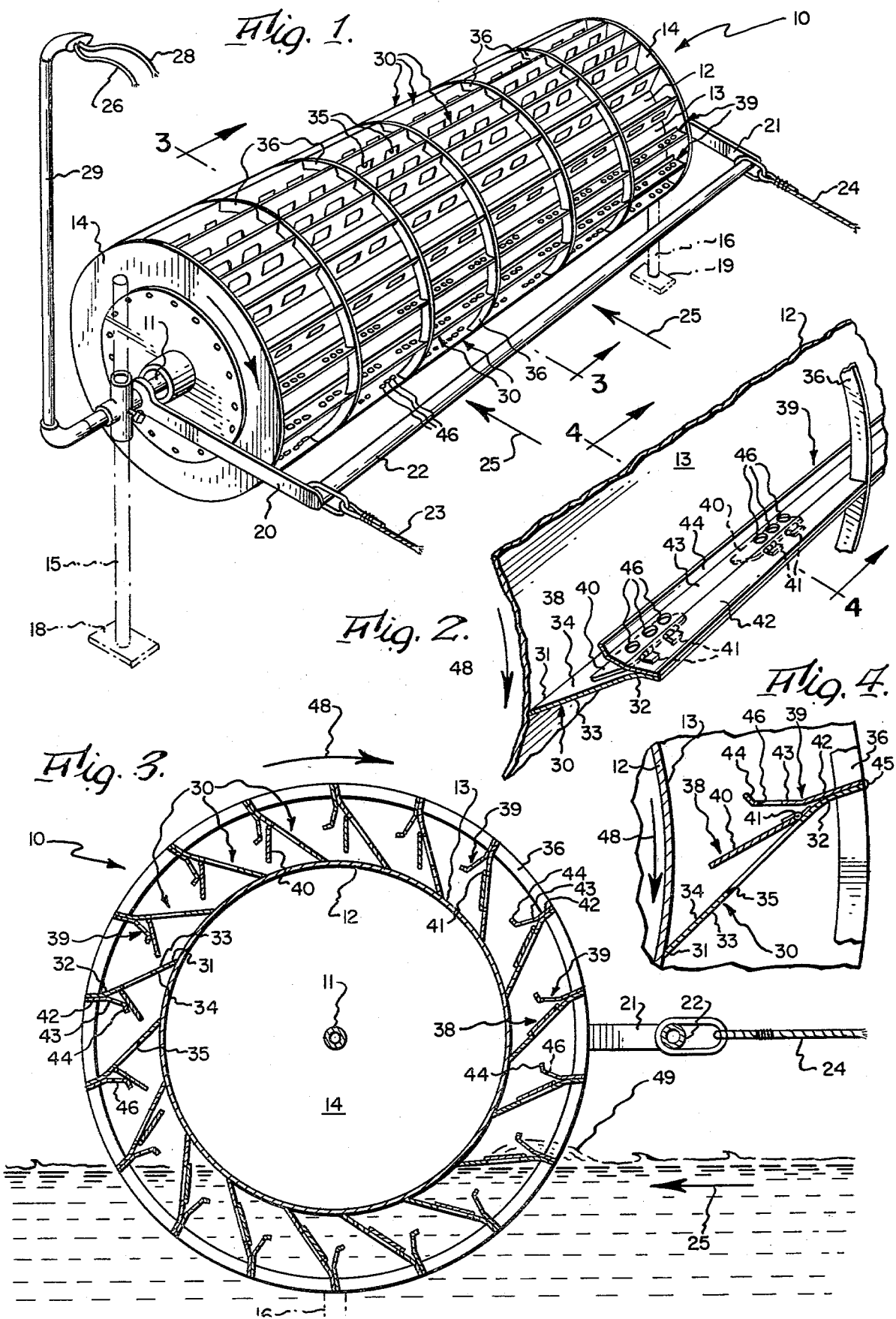

STREAM-POWERED TURBINE VANES

BACKGROUND OF THE INVENTION

1. Cross-Reference to Related Application

This application is a continuation-in-part of pending application Ser. No. 680,684, filed Apr. 27, 1976, now U.S. Pat. No. 4,104,536.

2. Field of the Invention

The present invention relates generally to a stream or river-powered turbine, and more particularly to an improved vane construction for use in such a turbine.

3. Description of the Prior Art

Many forms of river-powered turbines are known, as shown in the following U.S. Pat. Nos.: 646,712; 3,993,913; 1,780,548; 932,628; 1,669,005; and 2,730,631.

My prior application Ser. No. 680,684 also discloses a river-powered turbine having a plurality of circumferentially-spaced vanes, each provided with a valve opening an an associated flap valve. However, in my prior application, the flap valve was hinged on the inner portion of the vane. In use, problems were encountered because such flap valve would sometimes remain open when such vane entered the stream. The effect of this was to substantially reduce the vane surface area over which the flow pressure of the stream was effective.

SUMMARY OF THE INVENTION

The present invention provides an improvement for use in association with a stream-powered turbine adapted to be restrained in a partially-submerged condition in a flow of water. The turbine includes a shaft, a body rotatably mounted on the shaft and having an outer surface, and at least one axially-elongated vane having an inner end portion secured to the body outer surface, having an outer end portion spaced from the body outer surface, having a leading surface, having a trailing surface, and provided with at least one valve opening therethrough.

The improvement broadly comprises valve means mounted on the vane and operable to selectively close the valve opening, and shield means. The valve means includes a flap valve pivotally mounted on the vane for movement toward and away from the vane trailing surface. The flap valve is adapted to cover the valve opening when the vane enters the stream, and is adapted to uncover the valve opening when the vane exits the stream. The shield means is mounted on the vane outer end portion and extends away from the vane trailing surface to form a dam-like member over which water must normally pass to contact the vane trailing surface. The shield means has at least one control opening therethrough aligned with the valve flap.

When the turbine rotates to cause the vane to enter the stream, water may pass through the control opening to close the flap valve to insure that the full area of the vane trailing surface will be exposed to the pressure of water flowing in the stream.

Accordingly, one object of the present invention is to provide an improved stream powered turbine.

Another object is to provide an improved vane construction for a stream powered turbine.

Still another object is to provide an improved stream-powered turbine in which the flow pressure of such stream is applied to the full area of the vane trailing surface.

These and other objects and advantages will become apparent from the foregoing and ongoing specification, the drawings, and the appended claims.

BRIEF DESCRIPTION OF THE DRAWINGS

FIG. 1 is a perspective view of a stream-powered turbine embodying the improved vanes of the present invention. FIG. 2 is a fragmentary enlarged perspective view of a portion of one of the vanes, this view looking at the trailing surface thereof.

FIG. 3 is a fragmentary enlarged transverse vertical sectional view of the turbine, taken generally on line 3—3 of FIG. 1, this view illustrating the operation of the flap valves as the vanes enter and leave the stream.

FIG. 4 is a fragmentary transverse vertical sectional view of a vane, taken generally on line 4—4 of FIG. 2, showing a vane in transverse cross-section.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the several drawing figures, and more particularly to FIG. 1 thereof, the present invention provides an improvement for use with a stream-powered turbine, generally indicated at 10. As used herein, the term "stream" is intended to broadly include rivers, streams, creeks, or some other flow of water.

In FIG. 1, the turbine 10 is depicted as including an elongated substantially-horizontal shaft 11, and a body 12 rotatably mounted on shaft 11 and provided with a cylindrical outer surface 13. The ends of body 12 are shown closed by end heads 14, 14. The shaft 11 is further shown as being supported by a pair of struts 15, 16 having lowermost feet 18, 19 adapted to rest on the bottom of the stream. Arms 20, 21 extend forwardly from shaft 11, and these arms are connected by a cross-member 22. A pair of cables 23, 24 are connected to the cross-member 22, and are also suitably anchored to supports on the shore so as to restrain or hold the turbine transversely in the flow of water in the stream, the direction of such flow being indicated by arrow 25. Thus, in use, the turbine 10 is adapted to be restrained in a partially submerged condition across a stream so that the flow of water will cause body 12 to rotate about shaft 11. Moreover, this turbine may contain suitable apparatus (not shown) for converting rotary motion of body 12 into electrical power, pressurized fluid, or the like. In the illustrated embodiment, turbine 10 may be regarded as including a suitable electrical generator (not shown), the output of which is delivered through insulated conductors 26, 28 passing through shaft 11 and a vertical standpipe 29.

Still referring principally to FIG. 1, the turbine is shown as further including a plurality of axially-elongated vanes or blades, severally indicated at 30, there being eighteen of such vanes spaced equally about the circumference of the body outer surface 13 in the preferred embodiment (FIG. 4).

As best shown in FIGS. 2 and 4, each vane 30 has as inner end portion 31 suitably secured, as by welding, to the body outer surface 13. Each vane has an outer end portion 32 spaced from body outer surface 13, a leading surface 33, and a trailing surface 34. Adverting now to FIG. 1, each vane is shown as further provided with a plurality of axially-spaced rectangular valve openings, severally indicated at 35, therethrough, these being arranged in pairs of two each between a plurality of axially-spaced annular reinforcing rings 36.

Referring now to FIGS. 2 and 4, the improvement broadly comprises valve means, generally indicated at 38, mounted on each vane 30 and operable to selectively close each valve opening 35, and shield means, generally indicated at 39, also mounted on each vane. As best shown in FIG. 4, each valve means 38 includes a plate-like flap valve 40 pivotally mounted on the associated vane for movement toward and away from the vane trailing surface 34. These flap valves 40 are shown as being mounted for pivotal movement about hinges 41 arranged proximate the vane outer end portion 32. The pivotal axis of each of flap valves 40 is substantially parallel to the axis of shaft 11. These flap valves 40 are severally adapted to close or cover the associated valve opening 35 when such vane enters the stream, and are also adapted to uncover or open such valve openings when such vane exits the stream.

The shield means 39 is shown as being mounted on each vane outer end portion 32, and as extending away from the vane trailing surface 34 to form a dam-like member over which water must normally flow to contact the vane trailing surface. In the preferred embodiment, the shield means may include an elongated rectangular plate-like member suitably pressed to have three serial plate-like sections, these being indicated at 42-44. The first section 42 tangentially contacts the vane outer end portion 32 and is secured thereto by edge weld 45. The second section 42 is shown provided with at least one, and preferably three, control openings 46 ahead of and aligned with each flap valve 40 for a purpose hereinafter explained. The third section 44 forms a lip.

The operation of the improved turbine is schematically illustrated in FIG. 3. Assume that the turbine is rotating in a clockwise direction, as indicatd by arrow 48, and that the stream flows from right to left, as indicated by arrow 25. A standing wave 49 will be propagated immediately ahead of the turbine. As a vane approaches this standing wave, water may pass through the control openings 46 to close the associated flap valve 40. This insures that the valve openings 35 will be closed such that, as the turbine continues to rotate, the pressure of such flow will be subsequently applied against the entire area of the vane trailing surface 34 and the flap valve 40. As the vane exits or leaves the stream, the flap valves may open by their own weight to relieve any vacuum forming in chamber 50.

Thus, the function of the control openings is to insure that the flap valves will be closed before the pressure of the stream flow is applied to the vane trailing surface.

Therefore, while the presently preferred embodiment of the invention has been shown and described, persons skilled in this art will appreciate that various additional changes and modifications may be made without departing from the spirit of the invention, as defined by the following claims.

What is claimed is:

1. In a stream-powered turbine adapted to be restrained in a partially submerged condition in a flow of water, said turbine having a shaft, a body rotatably mounted on said shaft and having an outer surface, and at least one axially-elongated vane having an inner end portion secured to said body outer surface, having an outer end portion spaced from said body outer surface, having a leading surface, and having a trailing surface, and wherein said vane has at least one valve opening therethrough, the improvement which comprises:

valve means mounted on said vane and operable to selectively close said valve opening, said valve means including a flap valve pivotally mounted on said vane for movement toward and away from said trailing surface, said flap valve being adapted to cover said valve opening when said vane enters the stream and adapted to uncover said valve opening when said vane exits said stream; and shield means mounted on said vane outer end portion and extending away from said vane trailing surface to form a dam-like member over which water must normally pass to contact said vane trailing surface, said shield means having at least one control opening therethrough aligned with said flap valve;

whereby, when said turnbine rotates to cause said vane to enter the stream, water may pass through said control opening to cause said flap valve to cover said valve opening to insure that said valve opening will be closed when the pressure of said flow is applied to said vane trailing surface.

2. The improvement as set forth in claim 1 wherein said shield means has three of said control openings.

3. The improvement as set forth in claim 1 wherein the pivotal axis of said flap valve is parallel to the axis of said shaft.

4. The improvement as set forth in claim 3 wherein said pivotal axis is arranged proximate said vane outer end portion.

5. The improvement as set forth in claim 1 wherein said shield means is mounted on said vane trailing surface.

* * * * *